United States Patent
Bindal et al.

(10) Patent No.: US 8,458,131 B2
(45) Date of Patent: Jun. 4, 2013

(54) OPPORTUNISTIC ASYNCHRONOUS DE-DUPLICATION IN BLOCK LEVEL BACKUPS

(75) Inventors: Anuj Bindal, Bellevue, WA (US); Gaurav Deshpande, Redmond, WA (US); Guhan Suriyanarayanan, Redmond, WA (US); Bodhi Deb, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 12/713,187

(22) Filed: Feb. 26, 2010

(65) Prior Publication Data

US 2011/0213754 A1   Sep. 1, 2011

(51) Int. Cl.
*G06F 7/00* (2006.01)
*G06F 17/00* (2006.01)

(52) U.S. Cl.
USPC .......................... 707/640; 707/661; 711/162

(58) Field of Classification Search
None
See application file for complete search history.

(56) References Cited

U.S. PATENT DOCUMENTS

| | | | |
|---|---|---|---|
| 6,865,655 B1 * | 3/2005 | Andersen | 711/162 |
| 7,539,710 B1 * | 5/2009 | Haustein et al. | 1/1 |
| 7,840,537 B2 * | 11/2010 | Gokhale et al. | 707/652 |
| 2006/0010179 A1 | 1/2006 | Whitmyer, Jr. | |
| 2006/0212439 A1 | 9/2006 | Field | |
| 2008/0244204 A1 | 10/2008 | Cremelie et al. | |
| 2008/0250085 A1 * | 10/2008 | Gray et al. | 707/204 |
| 2008/0250086 A1 | 10/2008 | Kisley | |
| 2009/0041230 A1 * | 2/2009 | Williams | 380/28 |
| 2009/0204649 A1 | 8/2009 | Wong et al. | |
| 2009/0234892 A1 | 9/2009 | Anglin et al. | |
| 2010/0257523 A1 * | 10/2010 | Frank | 718/1 |
| 2010/0312752 A1 * | 12/2010 | Zeis et al. | 707/640 |

FOREIGN PATENT DOCUMENTS

KR   1020080018295 A   2/2008

OTHER PUBLICATIONS

"SANRAD Global Data Replication and Disaster Recovery Solution", Retrieved at<<http://www.sanrad.com/downloads/WhitePapers/GDR-WP-009-01.pdf>>, 2005, pp. 19.

(Continued)

*Primary Examiner* — Hosain Alam
*Assistant Examiner* — Azam Cheema
(74) *Attorney, Agent, or Firm* — Michael B Dodd; Dodd Law Group

(57) ABSTRACT

A block based backup system may store backed up data from multiple clients by maintaining backup databases for each client, where each backup database may include blocks of data. The backup system may perform a de-duplication process by examining the databases to identify common blocks and moving the common blocks to a common database. The common blocks may be removed from the client backup databases and a pointer substituted for the data, thus compacting the client backup databases. The de-duplication operation may be performed at an opportunistic time, such as after the clients have completed any data transfer to the backup system.

13 Claims, 4 Drawing Sheets

OTHER PUBLICATIONS

"Kondar Technology—Deduplication", Retrieved at<<http://www.lortu.com/en/deduplication.asp>>, Dec. 17, 2009, pp. 4.

"Data Deduplication and its Benefits", Retrieved at<<http://images.cxotoday.com/cxoimages/storyimages/matter107191.pdf>>, Sep. 9, 2009, pp. 7.

"BitWackr—Data Deduplication for Microsoft Windows Servers Hardware Assisted Data Deduplication and Compression with Thin Provisioning", Retrieved at<<http://public.hifn.com/Hifn%20Document%20Library/HifnPB-BitWackr-5.pdf>>, 2009, pp. 2.

"International search report", Mailed Date: Sep. 22, 2011, Application No. PCT/US2011/026354, Filed Date: Feb. 25, 2011, pp. 8.

* cited by examiner

OPPORTUNISTIC ASYNCHRONOUS DE-DUPLICATION IN BLOCK LEVEL BACKUPS

BACKGROUND

Backup systems may create a copy of data so that the copy may be used to restore the original after a data loss event. Backup systems can be used in disaster recovery, where a complete restoration of the original data may be performed after a storage system crash. Another use for backup system may be to restore small numbers of files in the event an accidental erasure or corruption of the files.

Backup systems can be used in a network environment to back up two or more client devices onto a single backup storage system. Typical installations may perform a backup operation on a periodic basis, such as a daily or weekly backup operation. Some systems may perform a full backup, where all of the original data are backed up, or an incremental backup, where only the changed data from the last backup operation are transmitted.

SUMMARY

A block based backup system may store backed up data from multiple clients by maintaining backup databases for each client, where each backup database may include blocks of data. The backup system may perform a de-duplication process by examining the databases to identify common blocks and moving the common blocks to a common database. The common blocks may be removed from the client backup databases and a pointer substituted for the data, thus compacting the client backup databases. The de-duplication operation may be performed at an opportunistic time, such as after the clients have completed any data transfer to the backup system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
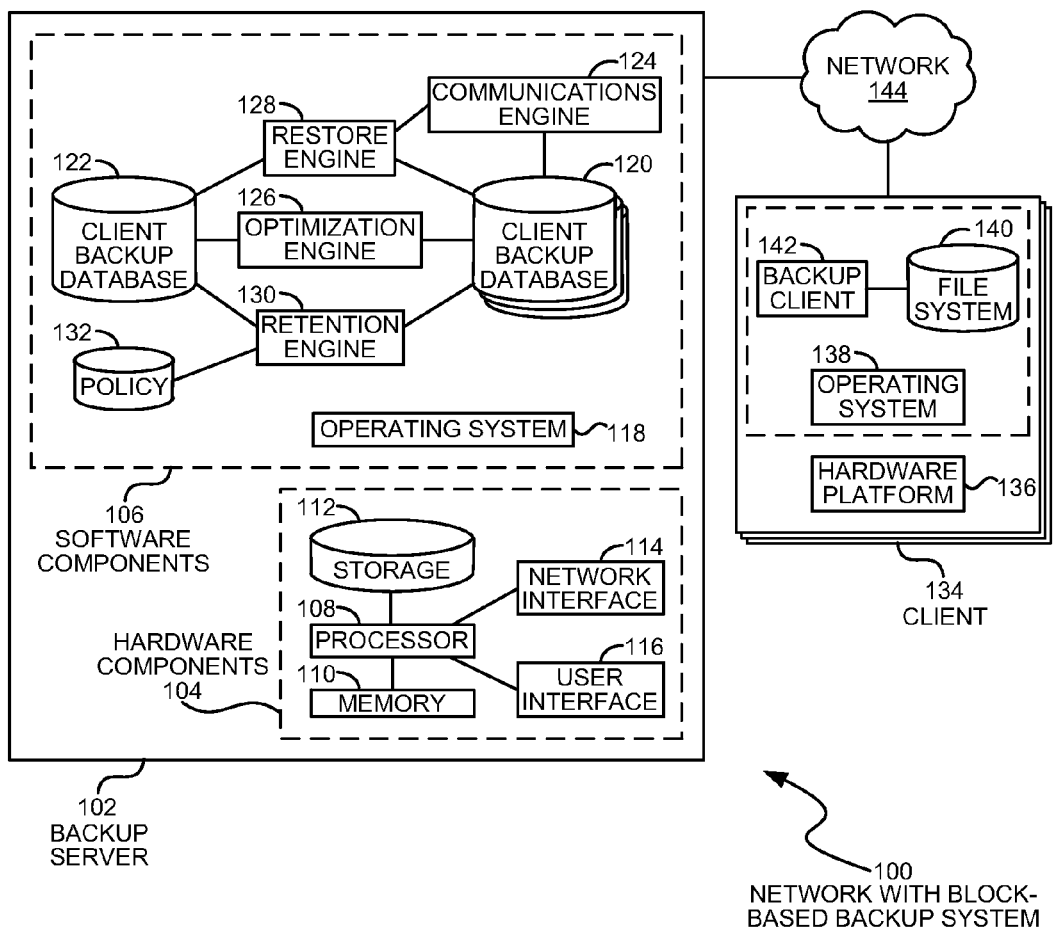
FIG. 1 is a diagram illustration of an embodiment showing a network environment in client backup system may operate.

A block based backup system may operate by creating client backup databases for multiple client devices. After the backup data are placed in separate client backup databases, duplicate blocks of data may be moved to a common backup database and removed from the client backup databases. This de-duplication may compact the client backup databases to a minimum size. The de-duplication operation may be performed at a different time than the backup operations and thus may be considered asynchronous with the backup operations.

Each client device may have a backup client application that may transmit data to back up to the backup system periodically. In many cases, the client device may transmit data that has changed from the previous backup operation as an incremental backup. The backup system may be configured to receive the backup data as rapidly as possible with a minimum of processing during the transmission operation.

Each backup instance may be represented within a backup database as a table that may contain identifiers for blocks of data in the sequence that the blocks were originally found on the client device. Since many subsequent backup operations may have many of the same blocks of data, each backup instance may be represented as a table containing pointers to the blocks of data stored in the backup database.

In one embodiment, separate backup databases may be created for each client device. For each backup instance of the client device, a table may be created with pointers to blocks of data within the backup database. A de-duplication operation may identify duplicate blocks of data between the client backup databases and move duplicated blocks into a common database to which pointers may be created from each of the various tables.

The backup system may use hash values to determine whether or not a block of data is in the database. The hash values may be calculated by the client prior to sending blocks of data to the backup system in some embodiments, while in other embodiments the backup server may perform the calculations.

The backup system may restore a client device may recreate the client data from a table of a specific backup. The table may list all of the blocks of data in the order that the blocks were originally placed.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system for backing up client devices. Embodiment 100 is a simplified example of a system that may create a backup database for each client, then compact those databases by moving duplicated blocks of data to a common database.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 may represent a backup system that may be capable of backing up multiple client devices to a backup server. During the backup operation, the client devices may transmit data to backup in the form of blocks. A block may be a typical unit of storage used by an operating system and may or may not correspond with individual files of a file system.

The blocks of data may be stored in a client backup database that may contain tables that represent the blocks of data in the order the blocks appear on the client device. The order of the blocks of data may be used to recreate an entire file system during a restore operation. When a block of data is located in a common backup database, the client backup database may include a pointer or link to the referenced block of data in the common backup database.

The backup server may periodically de-duplicate the client backup databases by comparing two or more backup databases with the common backup database. The comparison may identify blocks of data in the client backup databases that are common to other client backup databases or the common backup database. The common blocks may be moved to the common backup database if they are not already present, and removed from the client backup databases. A pointer to the common backup database may be inserted in the client backup database.

The de-duplication process may be performed with a subset of all the client backup databases in some embodiments. In such embodiments, the de-duplication process may be repeated with different subsets so that all combinations of client backup databases may be compared. At the end of such an analysis, the client backup databases may contain the blocks of data that are unique to each respective client and the common backup database may contain blocks of data that are shared between two or more clients.

In many cases, there may be a very high percentage of blocks of data that are common among client devices within a typical local area network. In many cases, certain applications may be installed on many or all of the clients in a network, for example word processing and spreadsheet applications, as well as common operating systems and data shared between devices. Each of these common elements may yield many common blocks of data.

In embodiment 100, a backup server 102 is illustrated as being connected through a network 144 to multiple client devices 134. A typical embodiment may be found in a small or medium sized business, and in some cases a larger enterprise or a home network. A backup server 102 may be capable of backing up a handful of devices to several tens or even hundreds of devices.

In some embodiments, the network 144 may be a local area network, while in other embodiments, the network 144 may include a wide area network such as the Internet.

The backup server 102 may be made up of various hardware components 104 and software components 106. The illustrated components may represent a typical server or desktop computer, although other embodiments may have different architectures and functional elements.

The hardware components 104 may include a processor 108, random access memory 110 and nonvolatile storage 112. The hardware components 104 may also include a network interface 114 and a user interface 116. The nonvolatile storage 112 may include hard disks, tape storage, optical storage, solid state storage, or any other type of storage. Some embodiments may use several types of nonvolatile storage.

The software components 106 may include an operating system 118 and various applications and databases may operate on top of the operating system.

A set of client backup databases 120 may operate with a common backup database 122. The client backup databases 120 may represent backup databases for the various clients 134. In a typical embodiment, each client may have a single client backup database 120, although some embodiments may allow a client to have two or more client backup databases 120. Such embodiments may have, for example, separate client backup databases designated for different file systems or different storage devices attached to a client. The common backup database 122 may contain the blocks of data that are common between the various clients.

The architecture of separate client backup databases and a common backup database creates a very compact overall backup system in that very little, if any duplicate blocks of data may be stored. The separate nature of the client backup databases may prevent a corruption or problem in one client database to adversely affect other client databases.

A communications engine 124 may receive backup data from the clients 134 and store the backup data in the various client backup databases 120. The communications engine 124 may allow two or more clients to simultaneously transmit data to the backup server 102. In some embodiments, multiple network connections or other hardware components may enable very high speed transfer of the data.

The communications between the clients 134 and backup server 102 may be minimized by reducing the processing time of both the clients 134 and the backup server 102. To prepare for a data transfer, a client device may identify the data to be transferred and then transfer the data without much processing. The backup server 102 may receive all of the data, store the data in a client backup database, and then process the data at a later time to identify any common blocks.

An optimization engine 126 may perform the comparisons between two or more client backup databases 120 to identify common blocks of data. The common blocks of data may be moved to a common backup database 122 and removed from the client backup databases 120.

During the compare operation, the optimization engine 126 may also identify common blocks that are referenced by only one client backup database or no client backup databases. When only one client backup database references a block in the common backup database 122, the optimization engine 126 may move the block to the referencing client backup database 120. When no client backup databases refer to the common block, the optimization engine 126 may remove the block of data from the common backup database 122.

The optimization engine 126 may remove blocks from the common backup database 122 when backup instances are removed from the client backup databases 120, or when one or more client backup databases 120 are removed from the system. Instances may be removed by the retention engine 130.

When the optimization engine 126 operates, the databases that are being processed by the optimization engine 126 may be locked so that other processes may not access the databases. In an example of such an embodiment, the various client devices 134 may be configured to transmit their backup data after business hours. The first two or three client devices that complete their backup may be processed by the optimization engine, and after that batch of client backup databases are complete, the next batch that have completed may be processed and so on.

A restore engine 128 may respond to a request to restore a backup instance from a client backup database. The restore engine 128 may identify the blocks that make up a backup instance, plus the order in which the blocks were positioned when the backup instance was created. The restore engine 128 may transmit those blocks in the original order to fulfill the request.

The restore engine 128 may operate to restore a client system in the case of a disk failure, for example. In such an operation, the restore engine 128 may be able to re-create a file system as it was during the last instance of a backup operation.

In another use, the restore engine 128 may be capable of re-creating any instance contained in a client backup database and making that instance available over a network connection. In such a use, the backup server 102 may create a backup instance and make the instance available as a shared network drive. The shared network drive may be presented as a read-only file system, allowing a user to copy an older version of a file to a current file system, for example.

A retention engine 130 may apply a retention policy 132 to manage the various backup instances. The retention engine 130 may identify older backup instances in the client backup databases 120 and remove those instances. The retention policy 132 may define how long instances may be retained. For example, a retention policy 132 may maintain backup instances for the last seven days, then a weekly backup instance may be maintained for the last four weeks, and a monthly backup for the last twelve months.

The retention engine 130 may indicate that a backup instance is to be remove, then may identify the various blocks from the client backup database 120 that are no longer used. Those blocks may be removed from the client backup database 120. If the backup instances that are removed reference blocks in the common backup database 122, the optimization engine 126 may detect those missing references and delete the common block from the common backup database 122 if the block is no longer referenced.

The client 134 may be any type of computing device. In many cases, the client 134 may be a desktop computer, but the client 134 may be any computing device that may perform the functions described for client 134. The client 134 may be a personal computer, server computer, or other similar computing device. The client 134 may also be a portable device, such as a laptop computer, netbook computer, mobile telephone, personal digital assistant, handheld scanner, or any other computing device. In some cases, the client 134 may be a game console, network router device, network appliance, or other device.

The client 134 is illustrated as having a hardware platform 136. The hardware platform 136 may be similar to the hardware components 104 illustrated for the backup server 102.

The client 134 may have an operating system 138 which may maintain a file system 140. A backup client 142 may be an application or service that executes on the client 134 and performs many of the communication functions with the backup server 102. A more detailed example of such operations may be found in embodiment 300 later in this specification.

Figure 2:
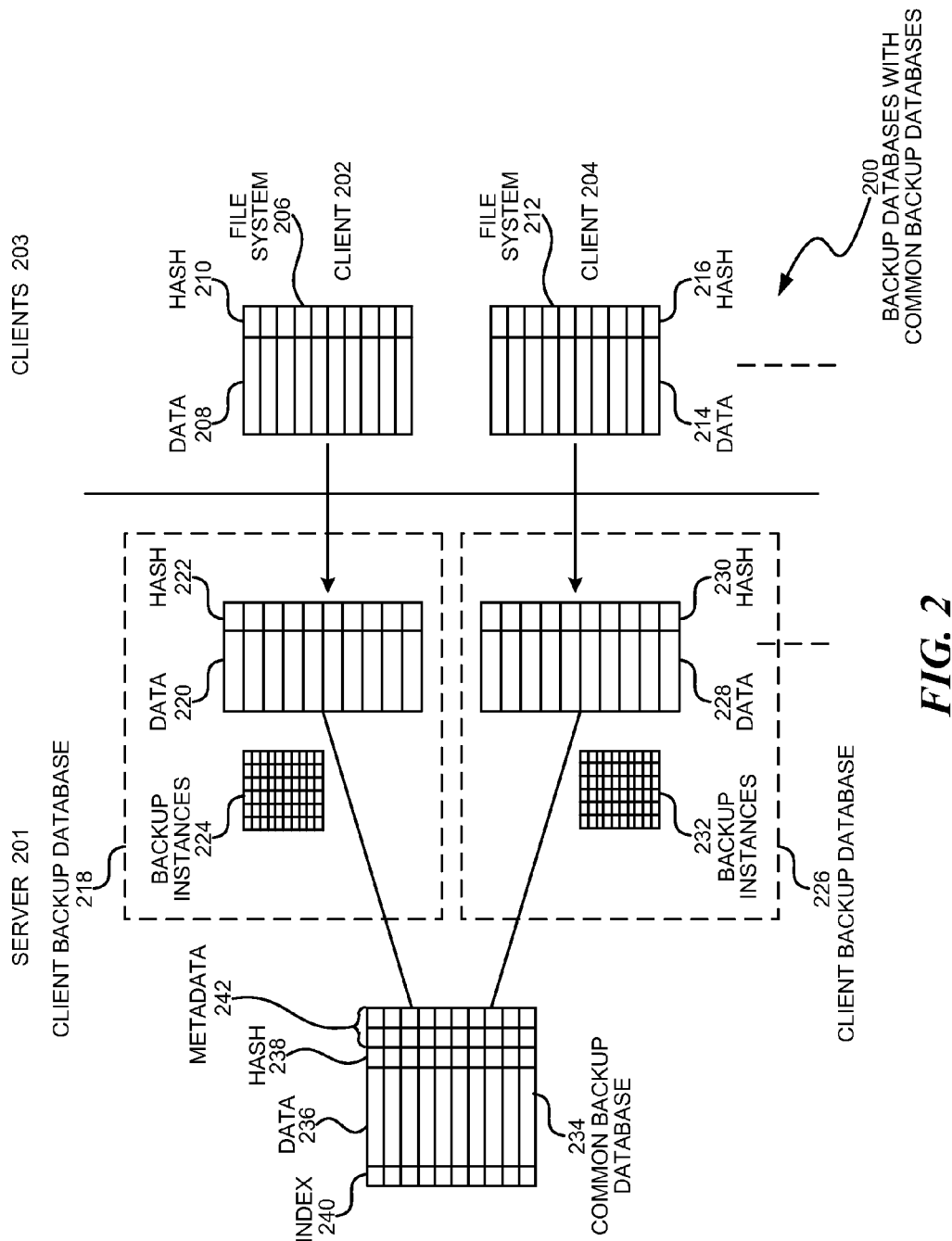
FIG. 2 is a diagram illustration of an embodiment showing a set of backup databases used in a backup system.

FIG. 2 is a diagram of an embodiment 200, showing a simplified construction of the databases used in a backup system. Embodiment 200 is an example of the databases that may be represented in the client backup database 120 and common backup database 122 of embodiment 100.

Embodiment 200 illustrates components of a server 201 on the left, and components of clients 203 on the right. A client 202 may have a file system 206. The file system 206 may be made up of many blocks of data 208. Each block of data may be, for example, a sector or group of sectors as defined in a storage device. In some cases, an operating system may have a fixed block size. Other operating systems may have a variable block size. Similar to client 202, client 204 may have a file system 212 that contains blocks of data 214.

For each of the data blocks 208 in the file system, the client 202 may create a hash 210. Similarly, the client 204 may create a hash 216 for the data blocks 214 in the file system 212. The hashes 210 and 216 may be any type of checksum or hash calculation that can be used to identify the blocks of data. In some embodiments, the hash calculation may be a hash function that has high collision resistance, meaning that it would hard to find two different blocks of data that have the same hash value. Some embodiments may use various cryptographic hash functions such as MD5, SHA-1, RIPEMD, Whirlpool, Tiger, GOST-3411, or some other hash function.

The hash values may be used to identify blocks of data and to determine when an existing block of data is already stored in a database. By comparing hash values rather than the data itself, the calculations performed during large comparison operations may be significantly reduced.

During a backup operation, the client 202 may transmit the various blocks of data 208 to the client backup database 218 located on the server 201. The client backup database 218 may be constructed with the data 220, the hash value 222, and various backup instance metadata 224. Similarly, client 204 may transmit the blocks of data 214 to the client backup database 226 on the server 201. The client backup database 226 may be constructed with the data 228, the hash 230, and backup instance metadata 232.

The backup operation may be performed in several different manners. In one embodiment, the client device may merely transmit all of the blocks of data stored on the client device to the server. In such an embodiment, each backup operation may essentially transmit many of the same blocks with every backup operation. Once the data are received by the server, an optimization engine may scan the client backup database and the new backup data to identify any common blocks of data and add new blocks of data to the client backup database, as well as create the backup instance metadata that identifies the various blocks of data and their sequential position.

Such an embodiment may be useful in cases where the client device may have very little processing capability or when the client device has small amounts of data that are backed up. Such an embodiment may be also useful when the network bandwidth is great enough to support a full backup every time. In such an embodiment, there may be little savings in doing additional pre-processing or determining which blocks of data may be new and which may be already contained on the server.

In another embodiment, the client may determine which blocks of data have changed since the last backup. In one such embodiment, the client may request a list of blocks of data from the server and may receive the hash values for all of the blocks of data in the client backup database. In some such embodiments, the server may transmit only the hash values for the client backup database, while in other embodiments, the server may additionally transmit the hash values for blocks stored in the common backup database. The client device may calculate hash values for all of the locally stored blocks of data and compare those hash values to the hash valued supplied by the server to identify blocks of data that are not present on the server.

Such an embodiment may be useful when the data sets maintained on a client device are large and do not change frequently or in cases where the network bandwidth is small.

In another embodiment, a client may maintain a record regarding the blocks of data from a previous backup operation. One mechanism may be to store the hash values for all previous blocks of data. The stored hash values may be compared to the hash values of the current data to identify new blocks of data.

Another mechanism may be to store a snapshot of the file system at each backup operation, then to persist the snapshot until the next backup operation. At the next backup operation, the client may compare the current state of the file system with the persisted snapshot to identify changed blocks of data.

The client backup databases 218 and 226 may contain multiple instances of backup operations. The client backup databases 218 and 226 may contain blocks of backup data, each of which may have a hash value. The backup instances 224 may contain sequences with pointers to the blocks of data 220. The sequences may identify the sequence that the blocks were positioned in the original file system.

When an incremental backup is performed and several new blocks of data are added to the database, those blocks may be added to the data 220 with their hash value 222. A new backup instance may be created in the backup instances 224, and the new backup instance may include the hash values of the blocks that make up the backup operation.

Such an embodiment may be able to create a new backup instance by merely adding another sequence to the backup instances 224 and adding any new blocks to the client backup database 218. The additional storage usage for the incremental backup is merely that of the new blocks.

A de-duplication optimization may be performed when two or more client backup databases are present on the server 201. The optimization may search the client backup database 218 and 226 to identify blocks of data that are common. One copy of the common blocks may be moved to the common backup database 234 and the respective backup instances 224 and 232 may be updated to reference the common backup database 234 instead of the client backup database 218 or 226.

The de-duplication optimization may reduce the storage usage of the server 201 by shrinking the size of the respective client backup databases and consolidating commonly used blocks of data into a central location. In embodiments where many client devices are backed up, the storage savings may be very substantial.

The common backup database 234 may contain blocks of data 236 and their hash values 238, as well as other information such as index 240 and metadata 242. The common backup database 234 may be similar in construction to tables used to store the blocks of data 230 and hash values 222. The metadata 242 may be used by various other functions, such as a retention engine.

A retention engine may periodically purge the system of backup instances that are no longer to be kept based on an archiving or retention policy. As backups are removed from various client backup databases, the blocks of data in the common backup database 234 may be referenced by one client backup database or by no client backup databases. If only one client backup database references a block in the common backup database, that block may be moved to the client backup database and removed from the common backup database. If no client backup databases refer to a specific block of data, the block of data may be removed from the common backup database 234.

Figure 3:
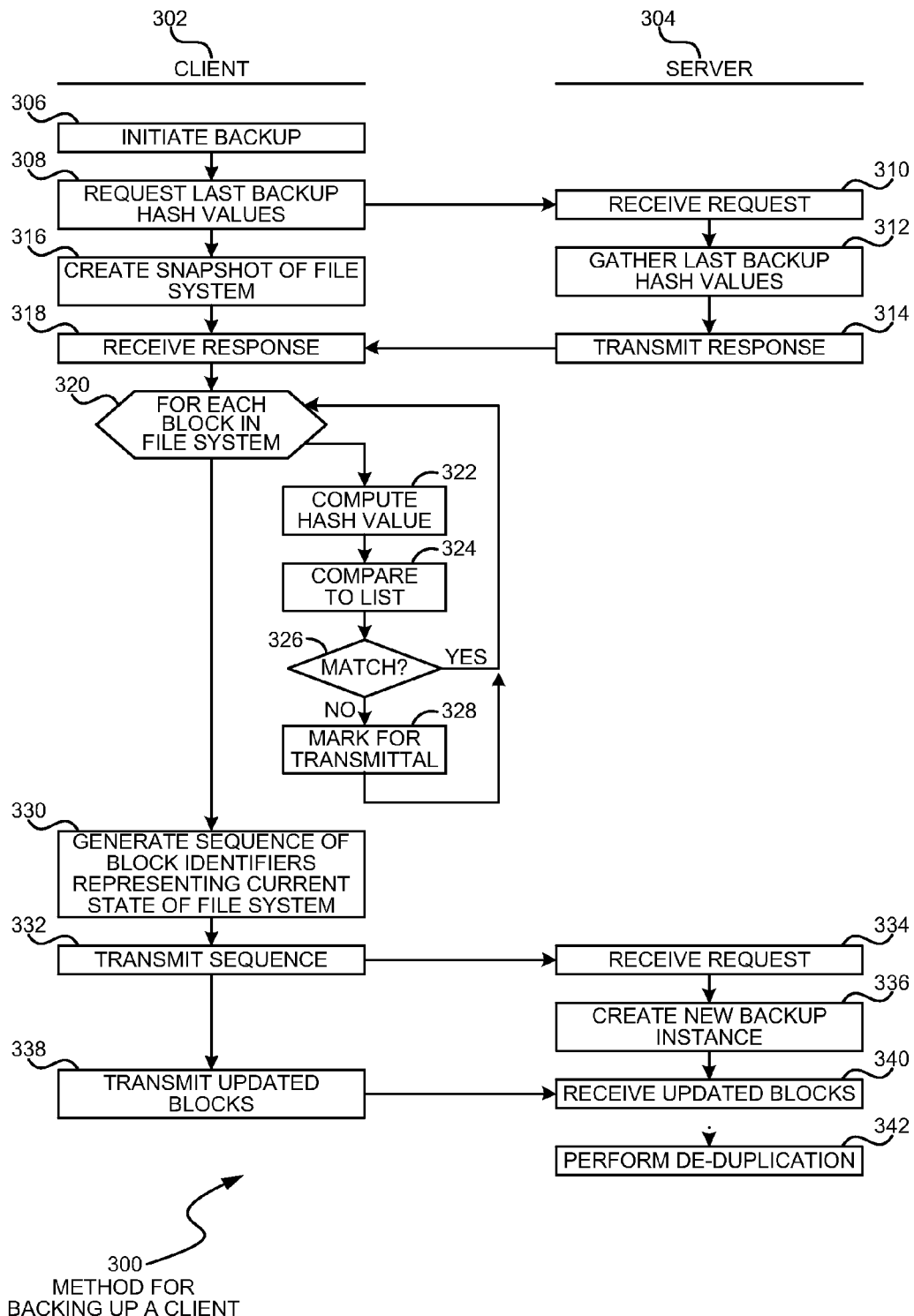
FIG. 3 is a flowchart illustration of an embodiment showing a method for backing up a client device.

FIG. 3 is a timeline illustration of an embodiment 300 showing a method for backing up a client device to a server. Embodiment 300 is an example of the handshaking and sequences that may be used to back up a single client device. Embodiment 400, presented later in this specification, may illustrate one method by which de-duplication may occur. In the illustration, the operations of a client 302 are illustrated on the left side and the operations of a server 304 are illustrated on the right side.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is one example of a method that may be used to back up a client device. Embodiment 300 illustrates a client device that uses hash values provided by a server 304 to identify changed blocks of data on the client 302. The embodiment further illustrates a method whereby all of the blocks of data to be transmitted may be marked prior to transmittal to the server 304.

Embodiment 300 is a method that may be optimized to reduce the time used to transmit a backup from the client 302 to the server 304 as any processing performed by the client 302 is performed prior to transmission. Such an embodiment may minimize the time that a server 304 may be in communication with the client 302.

In many embodiments, the server 304 may block access to a client backup database when the client 302 is transmitting a new backup to the server 304. During such periods, the server 304 may not be able to perform various actions, such as de-duplication, implementing retention policies, and other actions.

In block 306, a backup operation may be initiated. In many cases, a client device may have a schedule for performing a backup. For example, a schedule may be created to back up the client 302 every evening when the client 302 may not be used for other purposes. In some cases, the backup operation may be initiated by a user request to start the backup operation. In other cases, another device such as the server 304 may cause the client device 302 to initiate a backup operation.

A list of hash values for backed up blocks of data may be requested in block 308 from the client 302 and received by the server 304 in block 310. The server 304 may gather the hash values in block 312 and transmit the response in block 314. The client 302 may receive the response in block 318.

The hash values in block 312 may be the hash values contained in the client backup database. In some embodiments, the hash value may also include some or all of the hash values of a common backup database. The hash values may be used to identify those blocks of data that are already present so that those blocks may not be transmitted.

In block 316, a snapshot of the client file system may be created. In some embodiments, a snapshot may represent the status of a file system at some point in time. The contents of the snapshot may be used for performing a backup operation, during which the file system may be updated and changed by the normal operations of the client.

In some embodiments, a snapshot may be stored or persisted on the client 302 until the next backup operation. In such embodiments, the persisted snapshot may be compared to a later snapshot to identify blocks of data that have been changed.

Each block in the file system of client 302 may be analyzed in block 320. For each block, a hash value may be computed in block 322 and the hash value compared to the list of hash values received from the server 304 in block 324. If the hash value is not matched in block 326, the block may be marked for transmittal in block 328 and the process may return to block 320. If there is a match in block 326, the process may return to block 320 without marking the block.

A sequence of hash values or block identifiers may be created in block 330. The sequence may represent the sequence of blocks for the current backup operation. The sequence may be transmitted in block 332 and received by the server 304 in block 334. The server 304 may create a new backup instance in block 336 using the sequence.

The client 302 may transmit the marked blocks of data in block 338. The marked blocks may be those blocks that are both updated and not found on the server 304. The server 304 may receive the updated blocks in block 340.

After receiving the backup operation in block 304, the server 304 may receive several more backups from different clients. After two or more backups are received from different clients, the server 304 may perform a de-duplication operation in block 342.

The de-duplication operation may be considered an asynchronous operation because the de-duplication operation may be performed after the backup operation. The client may have performed its portion of the backup operation when the updated blocks 338 have completed transmitting, but the server 304 may perform the de-duplication operation as a background process or at some later time.

Figure 4:
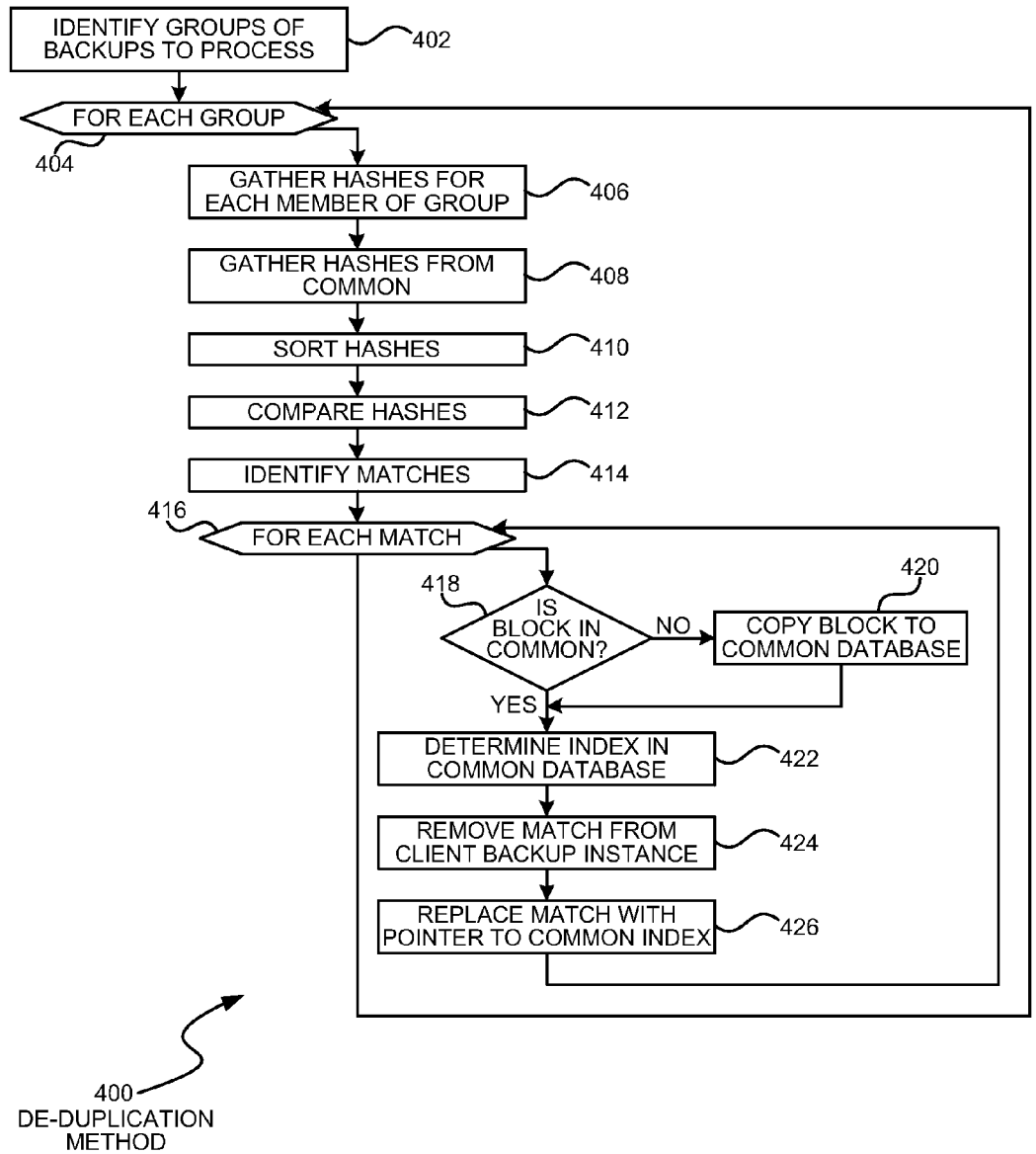
FIG. 4 is a flowchart illustration of an embodiment showing a method for performing de-duplication from several client backup databases.

FIG. 4 is a flowchart illustration of an embodiment 400 showing a method for de-duplication of a set of client backup databases. Embodiment 400 is an example of the operations that may be performed by an optimization engine, such as the optimization engine 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is one example of a de-duplication process that may identify common blocks in two or more client backup databases and move the common blocks to a common backup database. The operations of embodiment 400 may be performed after the backup operations have completed, and the embodiment 400 is an example of compression or optimization that may be performed to reduce the data storage used by the various backups.

In block 402, the groups of backups to process are identified. In a full optimization, a de-duplication operation may compare every client backup database with every other client backup database on the server. In many embodiments, the optimization process of embodiment 400 may cause each client backup database to be locked during the optimization. In order to allow some client backup operations to occur while a de-duplication operation is underway, the de-duplication operation may be performed on a subset of the client backup databases.

When a subset of client backup databases is analyzed, the de-duplication process may be performed on various combinations of client backup databases until every combination is analyzed.

Each group being analyzed may be processed in block 404.

The hash values for each member of the group may be gathered in block 406. In block 408, the hash values from the common backup database may be gathered. The hash values may be sorted in block 410 and compared in block 412 to identify matches in block 414.

Each match may be processed in block 416. If the block is not in the common backup database in block 418, a copy of the block may be placed in the common backup database in block 420.

An index for the common block may be determined in block 422. The matching block may be removed from the client backup databases in block 424 and a pointer may be added in block 426 in the client backup databases to the common backup database.

After each match is processed in block 416, the method may return to block 404 to process additional groups of client backup databases. The various groups may be processed until all combinations of client backup databases are processes.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a backup server, a method being performed on a computer processor for de-duplicating backup data in storage managed by the backup server, said method comprising:
   accessing a first client backup database from storage managed by the backup server, said first client backup database storing a first one or more blocks of data, said first one or more blocks of backup data previously stored in said first client backup database to back up said first one or more blocks of backup data for a first client;
   accessing a second different client backup database from storage managed by the backup server, said second client backup database storing a second one or more blocks of backup data, said second one or more blocks of backup data previously stored in said second client backup database to back up said second one or more blocks of backup data for a second different client;
   comparing hash values for blocks in said first one or more blocks to hash values for blocks in said second one or more blocks to identify a common block, including:
      determining that said common block is included in said first one or more blocks of backup data; and
      determining that said common block is included in said second or more blocks of backup data; and in response to identifying said common block, de-duplicating said common block by:
         storing said common block in a common backup database, said common backup database in storage managed by the backup server;
         inserting a pointer into said first client backup database, said pointer referencing the common block in said common backup database;
         inserting said pointer into said second client backup database;
         removing said common block from said first client backup database; and
         removing said common block from said second client backup database.

2. The method of claim 1 further comprising:
   receiving a request from said first client, said request being for a first set of identifiers for backup data stored in said first client backup database; and
   transmitting said first set of identifiers to said first client.

3. The method of claim 2, said request further being for a second set of identifiers, said second set of identifiers being for backup data stored in said common backup database.

4. The method of claim 1, further comprising:
   determining that said common block in said first client backup database is not to be retained; and
   removing a reference to said common block from said first client backup database.

5. The method of claim 4, further comprising:
   determining that said common block is no longer referenced from said first client backup database; and
   in response to the determination, moving said first common block from said common backup database to said second client backup database.

6. The method of claim 1, said first client backup database comprising identifiers for said first one or more blocks of data.

7. The method of claim 6, said identifiers being hash values calculated from said first one or more blocks of data.

8. The method of claim 1, further comprising:
   analyzing said first one or more blocks of data to create identifiers for each block of data within said first one or more blocks of data; and
   storing said identifiers in said first client backup database.

9. The method of claim 1, further comprising:
   receiving a first request for said first one or more blocks of data;
   identifying at least one block of data from said first client backup database;
   identify said common block from; and
   transmitting said at least one block and said common block in response to said first request.

10. The method of claim 9, further comprising:
    determining an order for said at least one block and said common block and transmitting said at least one block and said common block according to said order.

11. A backup server device comprising:
    a processor;
    a plurality of client backup databases, including a first client backup database, a second client backup database, and a common client backup database, each of said client backup databases comprising a repository for blocks of data and backup definitions and references to said blocks of data from said backup definitions;
    a communications engine that:
       establishes a first communication session with a first client device;
       determines that said first client backup database corresponds to said first client device;
       receives a first plurality of said blocks of data;
       stores said first plurality of said blocks of data in said first client backup database as a first backup;
       establishes a second communication session with a second client device;
       determines that said second client backup database corresponds to said second client device;
       receives a second plurality of said blocks of data; and
       stores said second plurality of said blocks of data in said second client backup database; and
    an optimization engine that:
       compares hash values for blocks in said first one or more blocks to hash values for blocks in said second one or more blocks to identify a common block, said common block being in both said first plurality of said blocks and in said second plurality of said blocks;
       in response to identifying said common block, de-duplicates said common block by:
          adding said common block to said common client backup database;
          inserting pointers into said first client backup database and said second client backup database, said pointes referencing said common block in said common client backup database; and
          removing said common block from said first client backup database and from said second client backup database.

12. The backup server device of claim 11, said optimization engine configured to operate when said communications engine is not receiving said blocks of data.

13. The backup server device of claim 11, further comprising:
- a restore engine that:
  - receives a request for said first backup;
  - identifies said first plurality of blocks of data; and
  - transmits said first plurality of blocks of data in response to said request,
- said first plurality of blocks comprising blocks of data from said first client database and said common client database.

* * * * *

UNITED STATES PATENT AND TRADEMARK OFFICE
CERTIFICATE OF CORRECTION

| | | |
|---|---|---|
| PATENT NO. | : 8,458,131 B2 | Page 1 of 1 |
| APPLICATION NO. | : 12/713187 | |
| DATED | : June 4, 2013 | |
| INVENTOR(S) | : Bindal et al. | |

It is certified that error appears in the above-identified patent and that said Letters Patent is hereby corrected as shown below:

In the Claims

In column 12, line 60, In Claim 11, delete "pointes" and insert -- pointers --, thereof.

Signed and Sealed this
Third Day of February, 2015

Michelle K. Lee
*Deputy Director of the United States Patent and Trademark Office*